United States Patent [19]

Dorner

[11] Patent Number: 4,609,172

[45] Date of Patent: * Sep. 2, 1986

[54] SHELF BRACKET AND COOPERABLE LOCKING BRACKET RETAINER

[76] Inventor: Steven C. Dorner, 5322 Fair Elms Ave., Western Springs, Ill. 60558

[*] Notice: The portion of the term of this patent subsequent to Aug. 13, 2002 has been disclaimed.

[21] Appl. No.: 696,654

[22] Filed: Jan. 31, 1985

Related U.S. Application Data

[63] Continuation-in-part of Ser. No. 503,668, Jun. 13, 1983, Pat. No. 4,534,529.

[51] Int. Cl.⁴ .............................................. F16L 3/08
[52] U.S. Cl. .............................. 248/222.1; 108/108
[58] Field of Search ............ 248/222.1, 220.2, 222.2, 248/223.1, 243.1, 245.1, 544, 235; 108/108; 211/192, 193

[56] References Cited

U.S. PATENT DOCUMENTS

| | | | |
|---|---|---|---|
| 2,576,865 | 11/1951 | Vanderveld | 248/243 |
| 3,836,009 | 9/1974 | Hordwitz et al. | 248/235 |
| 4,103,855 | 8/1978 | Grosse | 108/108 |
| 4,299,367 | 11/1981 | Harlan | 248/235 |
| 4,444,321 | 4/1984 | Carlstrom | 248/235 |

Primary Examiner—Ramon S. Britts
Assistant Examiner—Ramon O. Ramirez

[57] ABSTRACT

A retainer includes a wedge-shaped element received in a recess of a shelf bracket. At the proximal end of the shelf bracket the recess includes an edge extending at an angle to a slotted wall standard and the wedge forces the L-shaped legs of the brackets against the inner surface of the wall standard to secure mounting. The slotted wall standard may be an exposed wall standard or a hidden wall standard. A hang rod may be mounted at the distal end of the bracket with the same bracket and recess structure in which case the wedge forces the hang rod against an edge of the recess opposite the angled edge.

7 Claims, 8 Drawing Figures

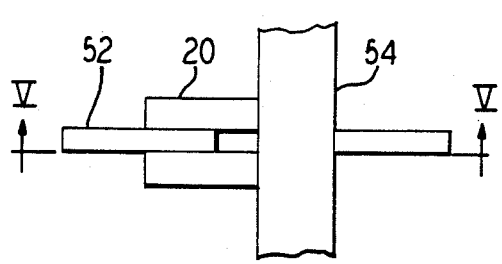
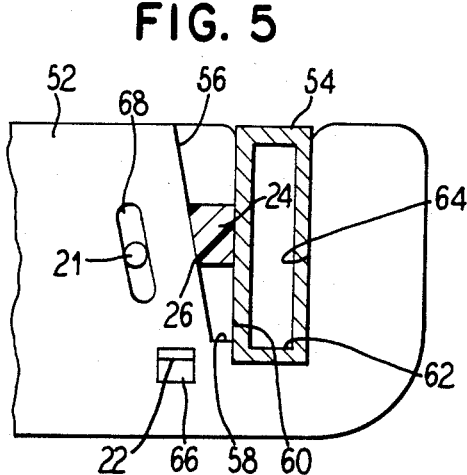
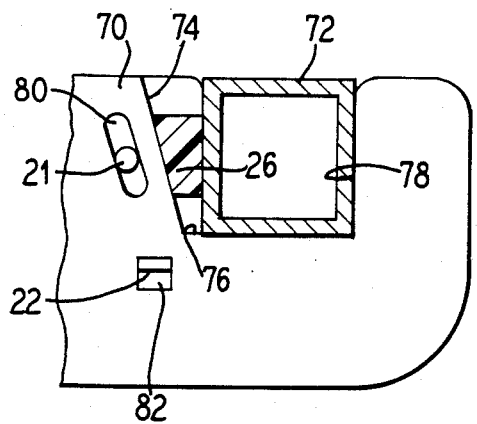
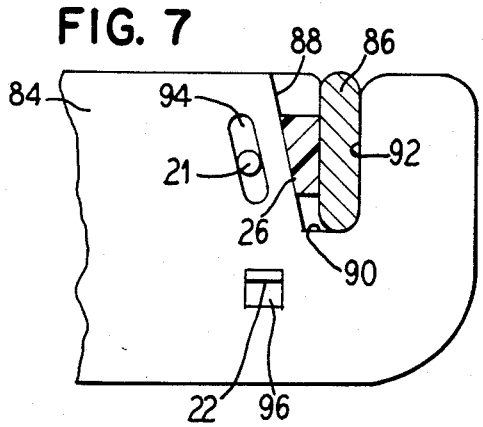
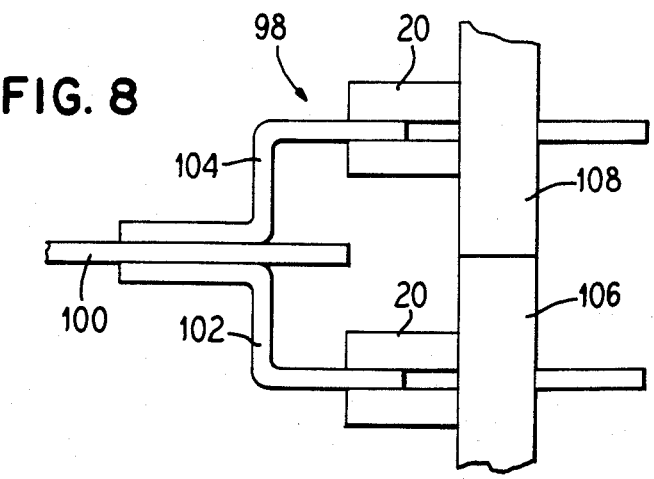

4,609,172

SHELF BRACKET AND COOPERABLE LOCKING BRACKET RETAINER

CROSS REFERENCE TO RELATED APPLICATION

This application is a continuation-in-part of application Ser. No. 503,668, filed June 13, 1983, now U.S. Pat. No. 4,534,529.

BACKGROUND OF THE INVENTION

1. Field of the Invention

The present invention relates to shelf structures and is more particularly concerned with a shelf bracket and a cooperable locking bracket retainer for positive, quick and easy securement of the shelf bracket to a slotted wall structure including a visible slotted wall standard or a hidden slotted wall standard as may be used in merchandising display hardware, and for securing hang rods to such brackets.

2. Description of the Prior Art

Present structures of providing a tight fit of a shelf bracket to a wall standard are very ineffective and frequently loosen and permit shelf brackets to slip out of the slotted standards. This causes spilling of merchandise, damage and possibly injury to persons standing nearby. These devices include cam locks, thumb screw tighteners and tap-tight fits. Structures for securing hang rods to shelf brackets generally utilize a force fit and loosen upon repeated assembly and disassembly.

SUMMARY OF THE INVENTION

The object of the present invention is to provide a new and improved structure for locking a shelf bracket to a slotted wall structure and prevent the same from moving up out of the wall standard and maintaining the bracket from swaying from side-to-side, particularly when long shelf brackets are used, and for locking hang rods to brackets.

The above object is achieved through the provision of a bracket which comprises a support member for supporting an article thereon and having a pair of L-shaped projections extending from its proximal end for hooking through respective ones of the slots of a slotted wall structure to locate the proximal end against the wall structure. A recess is provided in the proximal end or in the upper or lower edge adjacent the proximal end and includes a locking edge extending at a downwardly convergent angle with respect to the proximal end. A bracket retainer comprises a pair of spaced parallel plates which receive the support bracket therebetween. A locking member extends between the plates and includes a locking surface which is complemental to the locking edge. The locking surface and locking edges engage and wedge the proximal end against the wall structure when the upper end of at least one of the spaced plates is tapped.

A recess may also be provided at any location out to the distal end for receiving a hang rod and a hang rod retainer having the same structure as the bracket retainer, this structure hereinafter being referred to as a "retainer".

The bracket may also be provided with an unlocking aperture located adjacent an end of the locked retainer for receiving a prying tool, for example a screwdriver, to release the locking member.

BRIEF DESCRIPTION OF THE DRAWING

Other objects, features and advantages of the invention, its organization, construction and operation will be best understood from the following detailed description, taken in conjunction with the accompanying drawing, on which:

FIG. 4 is a fragmentary top view of the distal end of a shelf bracket supporting a hollow rectangular cross-section hang rod;

FIG. 5 is a sectional view taken along the line V—V of FIG. 4;

FIG. 6 is a fragmentary sectional view of the distal end of a bracket supporting a hollow square cross-section hang rod;

FIG. 7 is a fragmentary sectional view of the distal end of a bracket, supporting a solid generally rectangular cross-section hang rod; and FIG. 8 is a fragmentary top view of the distal end of a bracket supporting a pair of hang rods.

DESCRIPTION OF THE PREFERRED EMBODIMENTS

Figures 1, 2:
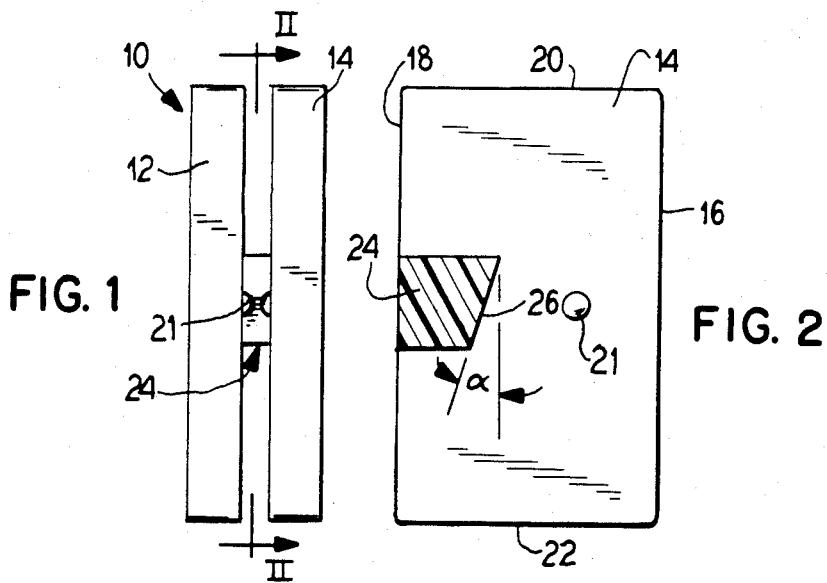
FIG. 1 is a front end view of a bracket retainer constructed in accordance with the present invention.
FIG. 2 is a sectional view taken substantially along the parting line II—II of FIG. 1 and providing an exaggerated showing of the locking surface.

Referring to the drawing, a retainer is generally illustrated at 10 as comprising a pair of parallel plates 12, 14 which are spaced apart and connected together by way of a locking member 24. Each of the plates 12, 14 has a forward edge 16, a rear edge 18, an upper edge 20 and a lower edge 22.

As seen in FIG. 2, the locking member 24 has a surface 26 which extends at an angle $\alpha$ from vertical, the term vertical being used here in the sense that the device is employed in the vertical orientation shown on the drawing. The angle $\alpha$ is in the range of 7°–10°.

As will be understood from the description below, each of the plates 12, 14 carries a slight projection 21 on its inner surface for retaining the retainer to the bracket upon unlocking.

The retainer is resilient and may be constructed of steel or a durable, strong plastic material, such as teflon-nylon or hard rubber.

Figure 3:
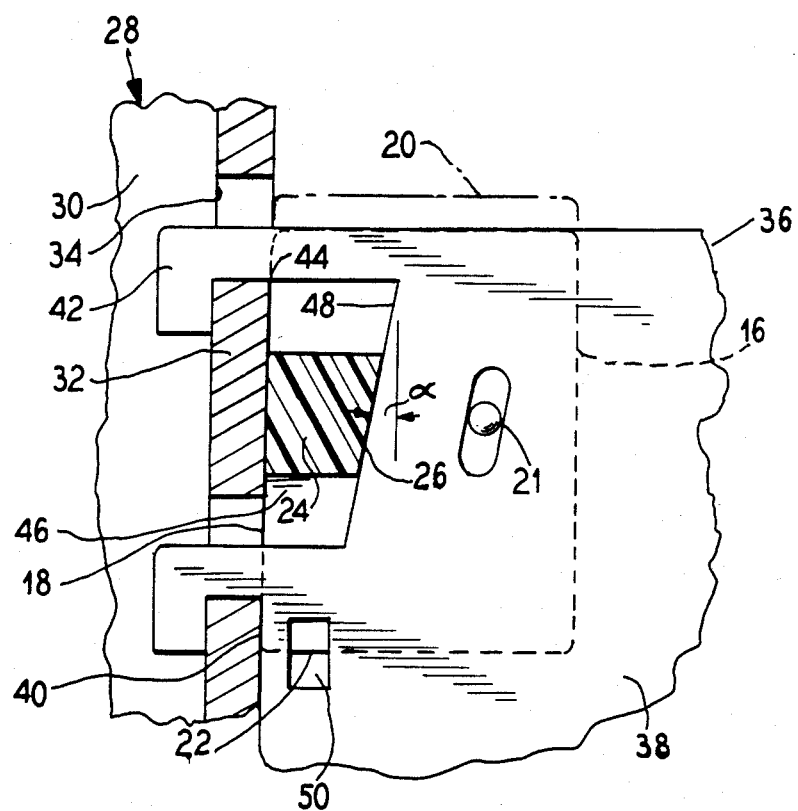
FIG. 3 is a sectional view similar to FIG. 2 and also showing a cooperable shelf bracket mounted in a slotted wall standard.

Referring to FIG. 3, the bracket retainer is illustrated along with a shelf bracket and a typical wall standard.

The wall standard may be a U-shaped elongate structure 28, here shown in section so that only one leg 30 is illustrated. The base 32 of the U-shaped structure comprises a plurality of spaced slots 34. A shelf bracket 36 comprises a generally flat member 38 having a proximal end 40 and at least two L-shaped projections 42 extending from said proximal end. As shown, in use the L-shaped projections are moved through the slots and down so that their forward facing edges 44 lie behind the inner surface of the base 32.

The bracket is provided with at least one recess 46 between the L-shaped members 42, the recess 46 having a locking edge 48 extending downwardly convergent with respect to the proximal end 40 of the bracket, at the angle $\alpha$. As shown, clearance is provided for up and down movement of the locking wedge.

It will be noted that the upper end of the retainer 10 may lie above the upper edge of the shelf bracket prior to wedging, as shown, in phantom, to facilitate access and to receive a slight downward tap to effect the wedging action. When installed, the retainer forces the bracket 36 in the direction of its distal end and forces the edges 44 tightly against the inner surface of the standard.

The retainer may be released by applying a sharp blow to the bottom side of the bracket. As an alternative, the bracket may be provided with an aperture 48 which is disposed for access to the lower edge 22 of the retainer. A screwdriver, for example, may then be employed to pry the retainer up to unlock the structure. The retainer cannot be accidentally moved up because of the weight of the shelf and the shelf contents which provide an added holding power and safety of the locking feature.

The bracket also includes a slot 37 extending at the angle α for receiving the projections 21.

Referring now to FIGS. 4–8, the application of the retainer for clamping a hand bar will be discussed.

Referring first to FIGS. 4 and 5, the distal end 52 of a bracket is shown as holding a hollow rectangular cross section hang rod 54. In order to accommodate the locking member 24 and the hang rod 54, a recess is provided in the upper edge of the bracket and is bounded by the edges 56, 58, 60, 62 and 64. As shown, the locking surface 26 acts against the surface 56 at the angle α and wedges the hang rod 54 tightly against the edge 64.

As shown, the bracket further includes an aperture 66 for receiving a prying instrument.

As also seen, the bracket includes an elongate aperture 68 at the angle α for receiving the projections 21 so that the retainer is retained to the distal end of the bracket.

Referring to FIG. 6, a similar structure is illustrated for the distal end 70 of a bracket which holds a hollow rectangular cross-section hang bar 72. A recess is provided in the upper edge of the bracket and is bounded by the edges 74, 76 and 78. Here, the surface 26 acts against the edge 74 and forces the hang rod 72 tightly against the edge 78.

Again, apertures 80 and 82 are provided for retaining and prying of the retainer.

Referring to FIG. 7, an embodiment is illustrated in which the distal end 84 of a bracket receives and clamps a generally rectangular solid hang bar 86. A recess is provided in the upper edge of the bracket, as before, and is bounded by the edges 88, 90 and 92. As with the previous embodiments, the surface 26 acts against the edge 88 and forces the hang rod 86 against the edge 92.

Here again, a prying aperture 96 and a retaining aperture 94 are provided.

FIG. 8 discloses the distal end 98 of a bracket for supporting a pair of hang rods 106, 108. The receiving recess of a bracket for the hand rod may take any of the forms illustrated above. Here, the embodiment of FIGS. 4 and 5 has been employed. The distal end 98 comprises a member 100 which extends to the proximal end and which is secured to, as by welding, a pair of S-shaped members 102, 104 which include the recesses mentioned above. A pair of retainers 20 clamp the hang rods 106, 108 to the members 102, 104.

In summary, the present invention permits larger recesses in the shelf bracket and eliminates costly, fragile and expensive punch press tool and die parts. The present shelf brackets that are dependent on small taper fits for securing the shelf brackets to slotted wall standards often have poor performance and much down time due to the small and fragile die components must be maintained at considerable expense. The components of the shelf bracket hooks can be made substantially stronger at the correct places, thus making the shelf bracket stronger than the present conventional shelf brackets.

I claim:

1. In combination, a bracket, at least one member to be clamped to said bracket and a retainer, said bracket comprising a proximal end, a distal end, an edge, and
   recess means defining a recess in said edge between said proximal end and said distal end for receiving said member including at least one first recess edge and a second recess edge extending at a predetermined angle to and facing said first recess edge, and
   said retainer comprising a wedge-shaped member including a first surface for engaging said at least one member and a second surface extending at said predetermined angle with respect to said first surface for engaging said second recess edge to clamp said member between said first recess edge and said first surface as said retainer is forced into the recess.

2. The combination of claim 1, wherein:
   said member comprises a hang rod;
   said bracket edge is an upper edge; and
   said recess means defines said recess opening at said upper edge adjacent said distal end of said bracket.

3. The combination of claim 1, wherein:
   said member is a wall structure including a slotted wall standard including front and rear surfaces;
   said bracket edge is a proximal edge at said proximal end;
   said recess means defines said recess in said proximal end opening at said proximal edge;
   said bracket comprises at least two L-shaped projections extending from said proximal end to be received in said slots of said wall standard and hooked against said rear surface; and
   said at least one first recess edge comprises a first recess edge on one of said projections for engaging said rear surface.

4. The combination of claim 1, wherein:
   said bracket comprises a bifurcated distal end comprising a pair of parallel support members respectively including first and second upper edges, said first upper edge constituting the first-mentioned bracket edge and said recess means defining the recess therein;
   further recess means defining a complemental recess in said second upper edge aligned with the first-mentioned recess;
   said at least one member comprises a pair of hang rods each aligned with the other and received in a respective recess; and comprising
   a pair of said retainers each locking a respective hang rod in its respective recess.

5. The combination of claim 1, wherein:
   said retainer is resilient and comprises two plate members connected to and spaced from one another by said wedge-shaped member for receiving said bracket therebetween, each of said plate members comprising a surface and a projection extending from said surface; and said bracket comprises a slot extending parallel to said second surface for receiving said projections and holding said retainer to said bracket upon unlocking.

6. A retainer for use with a display bracket which has a recess including a first and second edges facing each other, comprising:

a pair of plates of complementary shape; and a member connecting said plates spaced apart to provide a gap therebetween for receiving a display bracket, said member including a wedge section for engaging the first edge clamping another element therebetween to the second edge.

7. The retainer of claim 6, and further comprising:

a pair of projections each extending from a respective plate into the gap for holding said retainer to the display bracket.

* * * * *